United States Patent
Jau et al.

(10) Patent No.: US 9,542,201 B2
(45) Date of Patent: Jan. 10, 2017

(54) NETWORK BIOS MANAGEMENT

(71) Applicant: Quanta Computer Inc., Guishan Dist., Taoyuan (TW)

(72) Inventors: Maw-Zan Jau, Taoyuan (TW); Ching-Chih Shih, Taoyuan (TW)

(73) Assignee: QUANTA COMPUTER, INC., Taoyuan (TW)

( * ) Notice: Subject to any disclaimer, the term of this patent is extended or adjusted under 35 U.S.C. 154(b) by 0 days.

(21) Appl. No.: 14/631,037

(22) Filed: Feb. 25, 2015

(65) Prior Publication Data
US 2016/0246612 A1    Aug. 25, 2016

(51) Int. Cl.
*G06F 9/44* (2006.01)
*G06F 13/36* (2006.01)
*G06F 9/445* (2006.01)

(52) U.S. Cl.
CPC ............. *G06F 9/4416* (2013.01); *G06F 8/665* (2013.01); *G06F 13/36* (2013.01)

(58) Field of Classification Search
CPC .. H04L 67/025; H04L 41/046; H04L 41/0803; G06F 21/57; G06F 8/63; G06F 8/65
USPC .................................................. 709/220, 222
See application file for complete search history.

(56) References Cited

U.S. PATENT DOCUMENTS

| | | | |
|---|---|---|---|
| 6,145,078 A | 11/2000 | Akamatsu | |
| 7,032,108 B2 | 4/2006 | Maynard et al. | |
| 7,178,019 B2* | 2/2007 | Lam | G06F 9/4416 713/1 |
| 7,293,165 B1 | 11/2007 | Tobias | |
| 7,640,426 B2 | 12/2009 | Garney | |
| 7,676,666 B2* | 3/2010 | Lambert | G06F 8/65 713/1 |
| 8,127,296 B2 | 2/2012 | Khatri et al. | |
| 8,275,982 B2* | 9/2012 | Vyssotski et al. | 713/1 |
| 8,898,797 B2 | 11/2014 | Konetski et al. | |
| 2004/0024840 A1* | 2/2004 | Levine | H04L 67/40 709/217 |
| 2009/0055157 A1 | 2/2009 | Soffer | |
| 2011/0225274 A1* | 9/2011 | Dvorkin | G06F 9/445 709/222 |

(Continued)

FOREIGN PATENT DOCUMENTS

| | | |
|---|---|---|
| CN | 1716879 A | 1/2006 |
| JP | 2006195770 A | 7/2006 |

(Continued)

OTHER PUBLICATIONS

"Using the BMC Management Utility: Dell OpenManage Baseboard Management Controller Utilities User's Guide", DELL OpenManage. Retrieved on Dec. 5, 2014 from: http://web.mit.edu/cron/documentation/dell-server-admin/en/BMC/bmcugc0d.htm. (45 pages).

(Continued)

*Primary Examiner* — Ruolei Zong
(74) *Attorney, Agent, or Firm* — Nixon Peabody LLP

(57) ABSTRACT

A computer system can obtain BIOS data from a network storage by a management controller of the computer system. The computer system can emulate a BIOS memory by the management controller based on the BIOS data and initialize the computer system with the BIOS memory emulated by the management controller.

17 Claims, 7 Drawing Sheets

(56) References Cited

U.S. PATENT DOCUMENTS

| | | | |
|---|---|---|---|
| 2013/0080754 A1* | 3/2013 | Ganesh | G06F 9/4403 713/2 |
| 2013/0262642 A1 | 10/2013 | Kutch et al. | |
| 2014/0230024 A1 | 8/2014 | Uehara et al. | |

FOREIGN PATENT DOCUMENTS

| | | |
|---|---|---|
| JP | 2009193453 A | 8/2009 |
| JP | 2013156993 A | 8/2013 |
| TW | 201319941 A1 | 5/2013 |

OTHER PUBLICATIONS

Kant, "Data Center Evolution", (2009).
Taiwanese Office Action mailed Feb. 17, 2016 for counterpart Taiwan application No. 10520171570.
Japanese Office Action 2015-208101 w/ First Office Action Summary.

* cited by examiner

100

```
┌─────────────────────────────────────────────────────────┐
│ OBTAINING BIOS DATA FROM A NETWORK STORAGE BY A         │── 110
│ MANAGEMENT CONTROLLER OF THE COMPUTER SYSTEM            │
└─────────────────────────────────────────────────────────┘
                            │
                            ▼
┌─────────────────────────────────────────────────────────┐
│ EMULATING A BIOS MEMORY BY THE MANAGEMENT               │── 120
│ CONTROLLER BASED ON THE BIOS DATA                       │
└─────────────────────────────────────────────────────────┘
                            │
                            ▼
┌─────────────────────────────────────────────────────────┐
│ INITIALIZING THE COMPUTER SYSTEM WITH THE BIOS MEMORY   │── 130
│ EMULATED BY THE MANAGEMENT CONTROLLER                   │
└─────────────────────────────────────────────────────────┘
```

FIG. 1

NETWORK BIOS MANAGEMENT

BACKGROUND

Field

This application relates to computer systems, and more particularly to a method of network Basic Input/Output System (BIOS) management, storage, and boot for computer servers.

Background

In a typical computer system (e.g., a rack server in a data center), a BIOS software program is stored on a BIOS memory (e.g., flash memory) located on a motherboard of the computer system. The BIOS stores firmware executed when the computer system is first powered on, along with a set of configurations specified for the BIOS. The BIOS firmware and BIOS configurations are stored in a non-volatile memory such as a non-volatile random-access memory (NVRAM) or a read-only memory (ROM) such as flash memory. The BIOS typically recognizes, initializes, and tests hardware present in a given computing system based on the set of configurations. The BIOS then gives control of the computer system to an operating system. The BIOS can provide an interface that allows a variety of different parameters to be set. For example, the BIOS may be used to specify clock and bus speeds, specify what peripherals are attached to the computer system, specify monitoring of health (e.g., fan speeds and CPU temperature limits), and specify a variety of other parameters that affect overall performance and power usage of the computer system.

Traditionally, each computer server in a data center contains a separate BIOS memory. Each BIOS is configured according to a configuration for each computer server. The administrator can update the BIOS using a flash utility application in the OS.

SUMMARY

The following presents a simplified summary of one or more embodiments in order to provide a basic understanding of present technology. This summary is not an extensive overview of all contemplated embodiments of the present technology, and is intended to neither identify key or critical elements of all examples nor delineate the scope of any or all aspects of the present technology. Its sole purpose is to present some concepts of one or more examples in a simplified form as a prelude to the more detailed description that is presented later.

In accordance with one or more aspects of the examples described herein, systems and methods are provided for network Basic Input/Output System (BIOS) management.

In an aspect, a method is provided for network Basic Input/Output System (BIOS) boot. The method includes obtaining BIOS data from a network storage by a management controller of the computer system. The method further includes emulating a BIOS memory by the management controller based on the BIOS data and initializing the computer system with the BIOS memory emulated by the management controller.

In another aspect, an apparatus is provided for network Basic Input/Output System (BIOS) boot. The apparatus includes a management controller configured for obtaining BIOS data from a network storage and emulating a BIOS memory based on the BIOS data. The apparatus further includes at least one processor configured for initializing the computer system with the BIOS memory emulated by the management controller.

In yet another aspect, a non-transitory computer-readable medium is provided for managing BIOS configurations for a computer system. The non-transitory computer-readable medium stores executable instructions which cause a data processing device to obtain BIOS data from a network storage, emulate a BIOS memory based on the BIOS data, and initialize a computer system with the BIOS memory emulated.

BRIEF DESCRIPTION OF THE DRAWINGS

These and other sample aspects of the present technology will be described in the detailed description and the appended claims that follow, and in the accompanying drawings, wherein:

FIG. 1 illustrates an example methodology for network Basic Input/Output System (BIOS) management;

DETAILED DESCRIPTION

Figure 2:
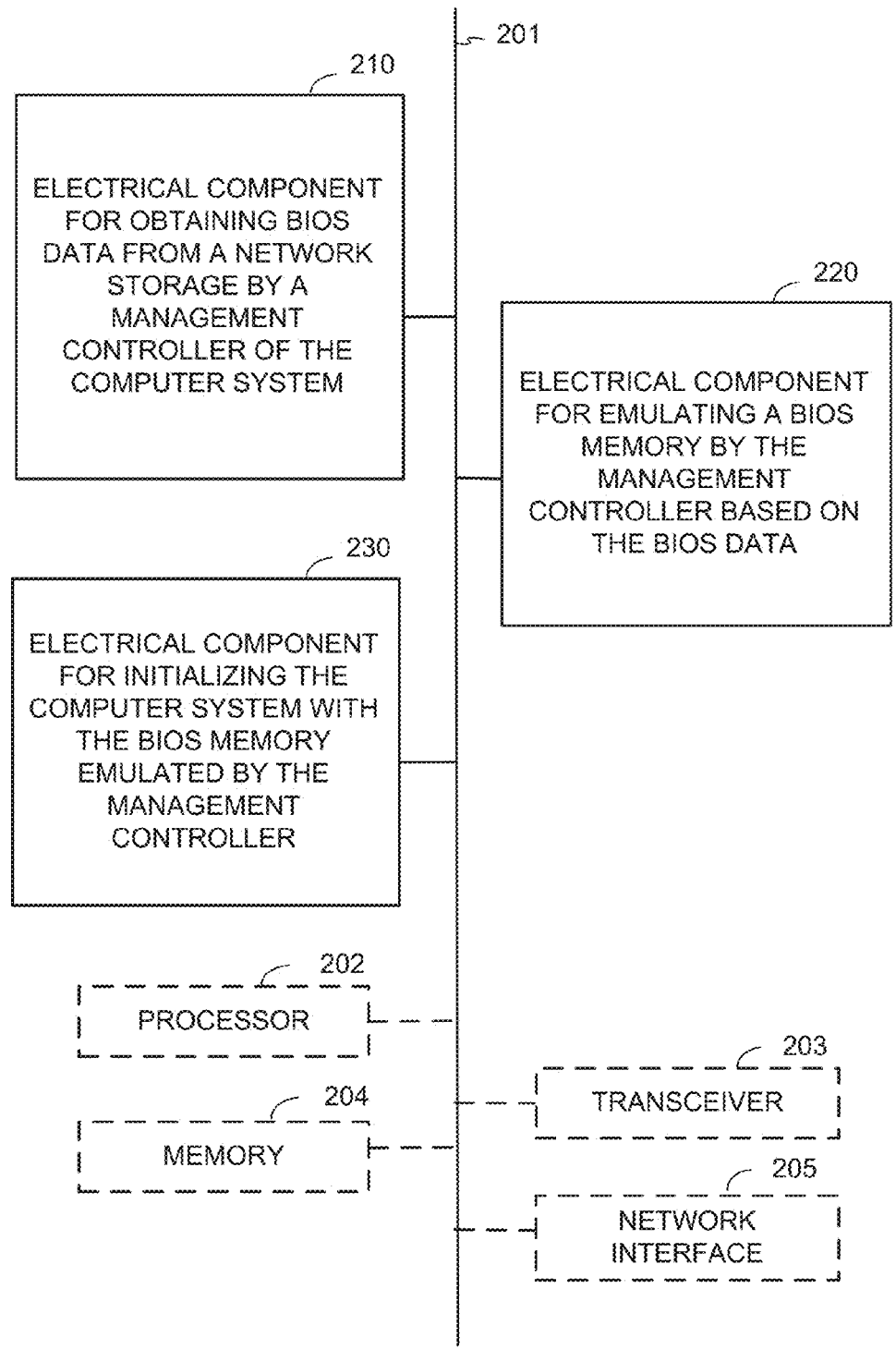
FIG. 2 illustrates a block diagram of an example apparatus for network BIOS management, in accordance with the methodology of FIG. 1.

The subject disclosure provides techniques for managing BIOS default configurations in accordance with the subject technology. Various aspects of the present technology are described with reference to the drawings. In the following description, for purposes of explanation, numerous specific details are set forth in order to provide a thorough understanding of one or more aspects. It can be evident, however, that the present technology can be practiced without these specific details. In other instances, well-known structures and devices are shown in block diagram form in order to facilitate describing these aspects. The word "exemplary" is used herein to mean "serving as an example, instance, or illustration." Any embodiment described herein as "exemplary" is not necessarily to be construed as preferred or advantageous over other embodiments.

Computer servers can be remotely managed in a manner that provides accessibility, consistency, and efficiency. Remote management removes the need for input/output interfaces (e.g., monitors, keyboards, and mice) in the servers. An administrator can manage a large data centers containing numerous rack servers using a variety of remote management tools, such as simple terminal connections, remote desktop applications, and software tools used to configure, monitor, and troubleshoot server hardware and software.

Existing technology requires each computer system, such as a computer server in a large data center, to include an individual BIOS memory chip. The computer system requires BIOS code from the BIOS memory chip during booting to recognize, initialize, and test hardware present in the computer system. Moreover, if an administrator wishes to update the BIOS memory of a group of computer servers, the BIOS memory for each computer server must be updated (e.g., flashed) individually. A new system and method of allowing a computer system to boot without a BIOS memory chip, as well as allow BIOS memory to be updated more efficiently, would provide an economical advantage in the manufacturing of the computer systems and simplify BIOS management.

In accordance with one or more aspects of the subject technology, a computer system can use a management controller such as a baseboard management controller (BMC) to emulate a BIOS memory, and thus remove the need for an actual BIOS memory chip in the computer system. To emulate BIOS memory corresponding to each individual computer system, the BMC can retrieve corresponding BIOS data from a network storage device. A processor of the computer system can then retrieve required BIOS code from the BMC to be used in booting. The disclosed method eliminates the need for BIOS memory chips to be included in network connected computer systems. The disclose method also increases BIOS management efficiency by eliminating the need to individually flash each BIOS memory chip to update the BIOS memory of a group of computer systems.

In accordance with one or more aspects of the implementations described herein, with reference to FIG. 1, a methodology 100 is shown for network BIOS management. The method 100 can involve, at step 110, obtaining BIOS data from a network storage by a management controller of the computer system.

In a related aspect, the BIOS data can include a BIOS image. The BIOS data can store firmware (i.e., program code stored in persistent memory) executed when the computer system is first powered on, along with a set of configurations. A processor can use the BIOS data to recognize, initialize, and test hardware present in a given computing system based on the set of configurations. The BIOS image can refer to a file that stores BIOS software.

In a related aspect, the management controller can include a BMC. The BMC can be a specialized microcontroller embedded on the motherboard of a computer, such as a server. The BMC can manage the interface between system management software and platform hardware.

In a related aspect, the management controller is connected to a southbridge chip via at least one of a Serial Peripheral Interface (SPI) bus, a Low Pin Count (LPC) bus, an Industry Standard Architecture (ISA) bus, an Enhanced Serial Peripheral Interface (eSPI), or another such bus interface. In a related aspect, the computer system does not include a BIOS memory. In a related aspect, network storage can include at least one of a Trivial File Transfer Protocol (TFTP) server, Hypertext Transfer Protocol Secure (HTTPS) server, File Transfer Protocol (FTP) server, or a server using any other transfer protocol.

In a related aspect, the method 100 can optionally involve receiving a user request for powering on the computer system before obtaining the BIOS data from the network storage.

The method 100 can involve, at step 120, emulating a BIOS memory by the management controller based on the BIOS data. In a related aspect, emulating the BIOS memory includes emulating a BIOS flash memory connected to at least one of a Serial Peripheral Interface (SPI) bus, a Low Pin Count (LPC) bus, an Industry Standard Architecture (ISA) bus, an Enhanced Serial Peripheral Interface (eSPI) bus, or another such bus. In a related aspect, the management controller includes a slave mode interface for at least one of a SPI bus, a LPC bus, an ISA bus, an eSPI bus, or another such bus.

The method 100 can optionally involve storing the BIOS data in a memory of the management controller. For example, the memory of the management controller can include non-volatile memory such as NVRAM or ROM such as flash memory.

The method 100 can involve, at step 130, initializing the computer system with the BIOS memory emulated by the management controller.

The method 100 can optionally involve powering on the computer system after emulating the BIOS memory. The method 100 can optionally involve fetching for BIOS code from at least one of a SPI bus, a LPC bus, an ISA bus, an eSPI bus, or another such bus, by a central processing unit (CPU) of the computer system. The method 1100 can optionally involve the CPU receiving the BIOS code from the management controller, in response to the fetching.

The method 100 can optionally involve receiving user input for changing BIOS settings, determining a new BIOS data based on the user input, and storing the new BIOS data on the network storage for use during a subsequent initialization of the computer system.

In accordance with one or more aspects of the implementations described herein, FIG. 2 illustrates an exemplary apparatus for network BIOS management, in accordance with the methodology of FIG. 1. The exemplary apparatus 200 can be configured as a computing device or as a processor or similar device/component for use within. In one example, the apparatus 200 can include functional blocks that can represent functions implemented by a processor, software, or combination thereof (e.g., firmware). In another example, the apparatus 200 can be a system on a chip (SoC) or similar integrated circuit (IC).

In one implementation, the apparatus 200 can include an electrical component or module 210 for obtaining BIOS data from a network storage by a management controller of the computer system.

The apparatus 200 can include an electrical component 220 for emulating a BIOS memory by the management controller based on the BIOS data.

The apparatus 200 can optionally include an electrical component 230 for initializing the computer system with the BIOS memory emulated by the management controller.

In further related aspects, the apparatus 200 can optionally include a processor component 202. The processor 202 can be in operative communication with the components 210-230 via a bus 201 or similar communication coupling. The processor 202 can effect initiation and scheduling of the processes or functions performed by electrical components 210-230.

In yet further related aspects, the apparatus 200 can include a radio transceiver component 203. A standalone receiver and/or standalone transmitter can be used in lieu of or in conjunction with the transceiver 203. The apparatus 200 can also include a network interface 205 for connecting to one or more other communication devices or the like. The apparatus 200 can optionally include a component for storing information, such as, for example, a memory device/component 204. The computer readable medium or the memory component 204 can be operatively coupled to the other components of the apparatus 200 via the bus 201 or the like. The memory component 204 can be adopted to store computer readable instructions and data for affecting the processes and behavior of the components 210-230, and subcomponents thereof, or the processor 202, or the methods disclosed herein. The memory component 204 can retain instructions for executing functions associated with the components 210-230. While shown as being external to the memory 204, it is to be understood that the components 210-230 can exist within the memory 204. It is further noted that the components in FIG. 2 can include processors, electronic devices, hardware devices, electronic subcomponents, logical circuits, memories, software codes, firmware codes, etc., or any combination thereof.

Persons skilled in the art will appreciate that the functionalities of each component of the apparatus 200 can be implemented in any suitable component of the system or combined in any suitable manner.

Figure 3:
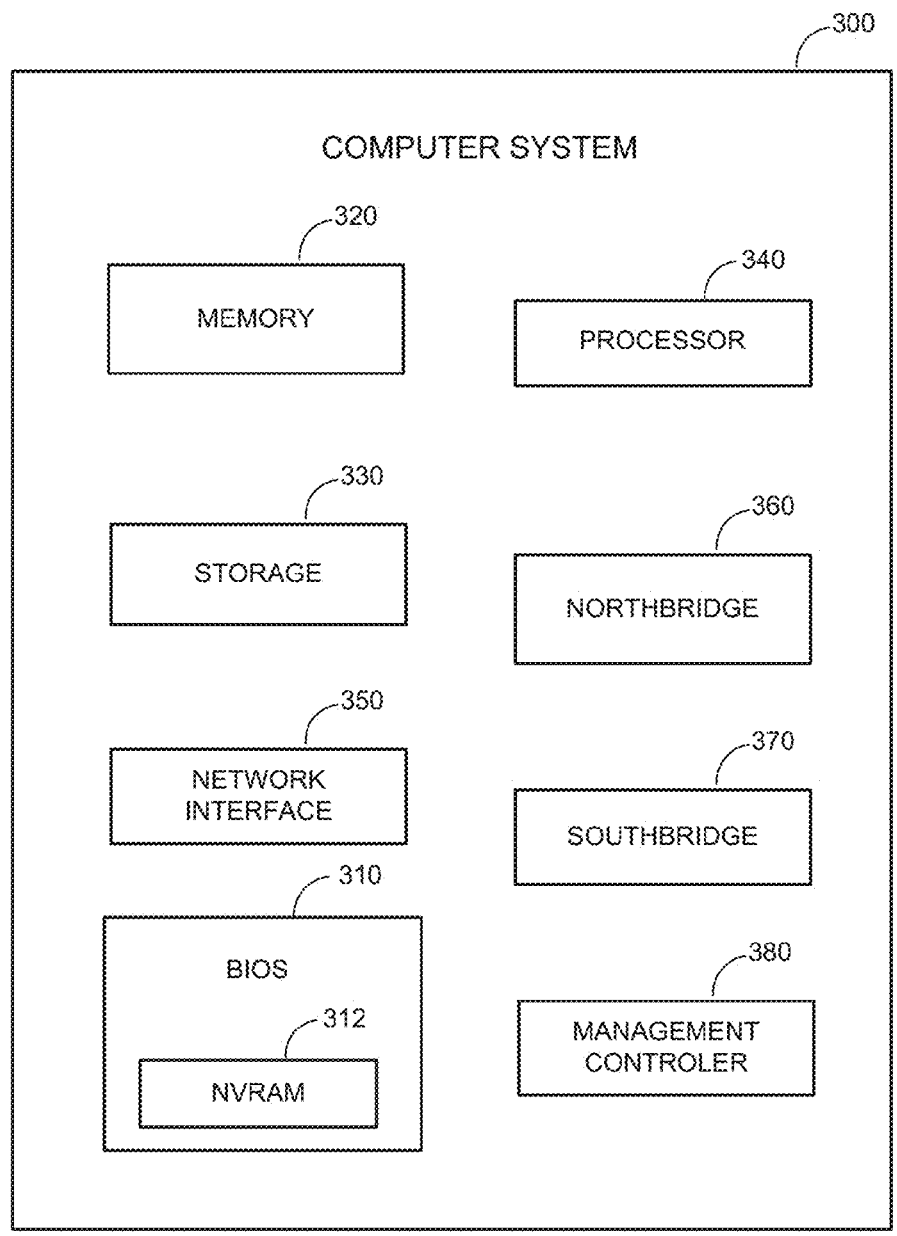
FIG. 3 illustrates a block diagram of an example computer system.

FIG. 3 illustrates a block diagram of an example computer system 300. The computer system 300 can include a processor 340, a network interface 350, a management controller 380, a memory 320, a storage 330, a BIOS 310, and a northbridge 360, and a southbridge 370.

The computer system 300 can be, for example, a server (e.g., one of many rack servers in a data center) or a personal computer. The processor (e.g., central processing unit (CPU)) 340 can be a chip on a motherboard that can retrieve and execute programming instructions stored in the memory 320. The processor 340 can be a single CPU with a single processing core, a single CPU with multiple processing cores, or multiple CPUs. One or more buses (not shown) can transmit instructions and application data between various computer components such as the processor 340, memory 320, storage 330, and networking interface 350.

The memory 320 can include any physical device used to temporarily or permanently store data or programs, such as various forms of random-access memory (RAM). The storage 330 can include any physical device for non-volatile data storage such as a HDD or a flash drive. The storage 330 can have a greater capacity than the memory 320 and can be more economical per unit of storage, but can also have slower transfer rates.

The BIOS 310 can include a Basic Input/Output System or its successors or equivalents, such as an Extensible Firmware Interface (EFI) or Unified Extensible Firmware Interface (UEFI). The BIOS 310 can include a BIOS chip located on a motherboard of the computer system 300 storing a BIOS software program. The BIOS 310 can store firmware executed when the computer system is first powered on along with a set of configurations specified for the BIOS 310. The BIOS firmware and BIOS configurations can be stored in a non-volatile memory (e.g., NVRAM) 312 or a ROM such as flash memory. Flash memory is a non-volatile computer storage medium that can be electronically erased and reprogrammed.

The BIOS 310 can be loaded and executed as a sequence program each time the computer system 300 is started. The BIOS 310 can recognize, initialize, and test hardware present in a given computing system based on the set of configurations. The BIOS 310 can perform self-test, such as a Power-on-Self-Test (POST), on the computer system 300. This self-test can test functionality of various hardware components such as hard disk drives, optical reading devices, cooling devices, memory modules, expansion cards and the like. The BIOS can address and allocate an area in the memory 320 in to store an operating system. The BIOS 310 can then give control of the computer system to the OS.

The BIOS 310 of the computer system 300 can include a BIOS configuration that defines how the BIOS 310 controls various hardware components in the computer system 300. The BIOS configuration can determine the order in which the various hardware components in the computer system 300 are started. The BIOS 310 can provide an interface (e.g., BIOS setup utility) that allows a variety of different parameters to be set, which can be different from parameters in a BIOS default configuration. For example, a user (e.g., an administrator) can use the BIOS 310 to specify clock and bus speeds, specify what peripherals are attached to the computer system, specify monitoring of health (e.g., fan speeds and CPU temperature limits), and specify a variety of other parameters that affect overall performance and power usage of the computer system.

The management controller 380 can be a specialized microcontroller embedded on the motherboard of the computer system. For example, the management controller 380 can be a baseboard management controller (BMC). The management controller 380 can manage the interface between system management software and platform hardware. Different types of sensors built into the computer system can report to the management controller 380 on parameters such as temperature, cooling fan speeds, power status, operating system status, etc. The management controller 380 can monitor the sensors and have the ability to send alerts to an administrator via the network interface 350 if any of the parameters do not stay within preset limits, indicating a potential failure of the system. The administrator can also remotely communicate with the management controller 380 to take some corrective action such as resetting or power cycling the system to restore functionality.

The northbridge 360 can be a chip on the motherboard that can be directly connected to the processor 340 or can be integrated into the processor 340. In some instances, the northbridge 360 and the southbridge 370 can be combined into a single die. The northbridge 360 and the southbridge 370, manage communications between the processor 340 and other parts of the motherboard. The northbridge 360 can manage tasks that require higher performance than the southbridge 370. The northbridge 360 can manage communications between the processor 340, the memory 320, and video controllers (not shown). In some instances, the northbridge 360 can include a video controller.

The southbridge 370 can be a chip on the motherboard connected to the northbridge 360, but unlike the northbridge 360, is not directly connected to the processor 340. The southbridge 370 can manage input/output functions, such as Universal Serial Bus (USB), audio, serial, BIOS, Serial Advanced Technology Attachment (SATA), Peripheral Component Interconnect (PCI) bus, PCI eXtended (PCI-X) bus, PCI Express bus, ISA bus, SPI bus, eSPI bus, System Management Bus (SMBus), of the computer system 300. The southbridge 370 can be connected to or can include within the southbridge 370 the management controller 370, Direct Memory Access (DMAs) controllers, Programmable Interrupt Controllers (PICS), and a real-time clock.

Figure 4:
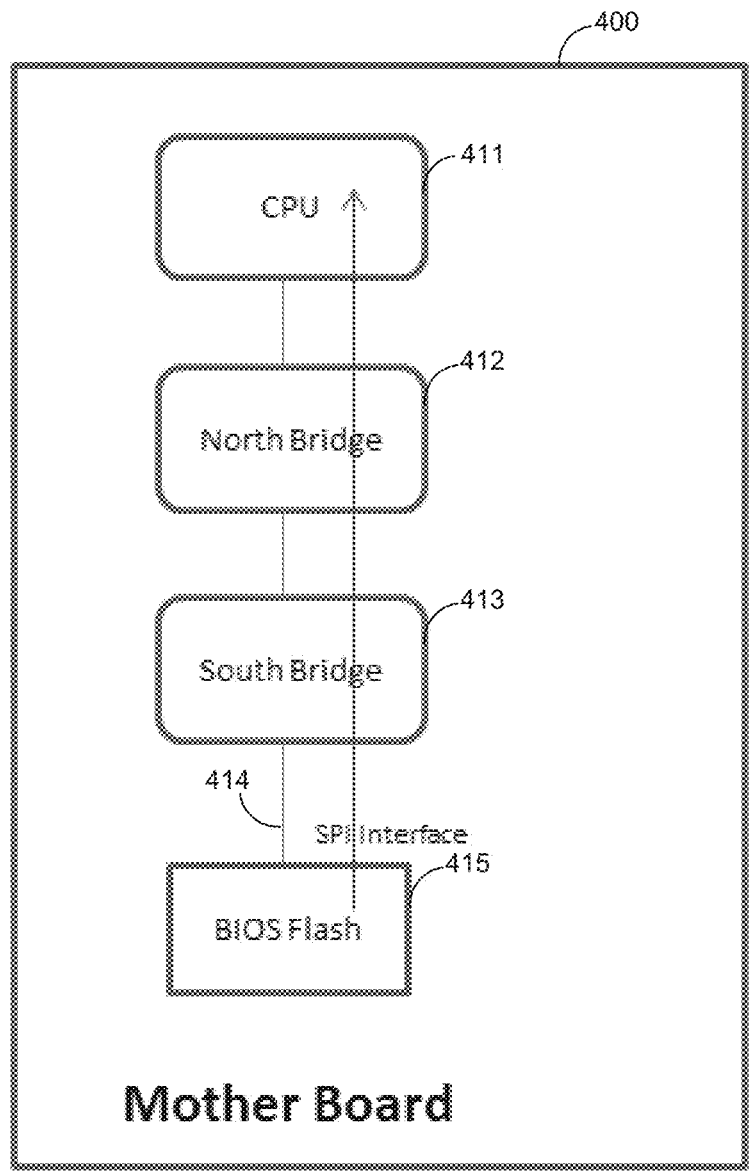
FIG. 4 illustrates a block diagram of an example motherboard for booting from a BIOS.

FIG. 4 illustrates a block diagram of an example motherboard 400 for booting from a BIOS. Booting is the initialization of a computer system. For example, when a computer system is powered on, the processor (e.g, CPU) 411 initializes itself and looks for BIOS data (i.e., instructions or code) in a predetermined memory address (e.g., address "FFFF:0000") of the BIOS memory (e.g., BIOS flash memory) 415 for a jump instruction (JMP). The CPU 411 can then follow the JMP which contains an address of the BIOS data in the BIOS memory 415. The computer system can then run POST and other startup procedures, according to the BIOS code. The CPU 411 can be connected to a northbridge 412, which can be connected to a southbridge 413. The southbridge 413 can be connected to the BIOS memory 415 via a bus 414 such as a SPI bus, an eSPI bus, or another such bus.

The SPI bus, sometimes referred to as a Synchronous Serial Interface (SSI), is a synchronous serial data link that operates in full duplex mode (i.e., mode which allows communications in both directions simultaneously). A single master device can communicate using a SPI bus with one or more slave devices. The SPI bus specifies four logical signals: Serial Cock (SCLK), Master Output Slave Input (MOSI), Master Input Slave Output (MISO), and Slave Select (SS). SCLK is an output signal from the master device. MOSI is an output signal from the master device. MISO is an output signal from the slave device. SS is used to select slave device out of a plurality of slave devices connected to the master device via a single SPI.

The eSPI standard was developed as a possible replacement for a LPC bus to allow a reduction in the number of pins required on motherboards. The LPC bus is a legacy bus developed as the replacement for an ISA bus. Communications that were out-of-band when using the LPC bus, such as for example a general-purpose input/output (GPIO) and SMBus, are tunneled through the eSPI bus in order to remove those pins from motherboard designs when using the eSPI standard. Example devices that can be supported over an eSPI interface include Embedded Controllers (EC), BMCs, and Super-I/O's (SIO). The EC and SIO are generally applicable for client platforms while a BMC is generally applicable for server platforms.

Figure 5:
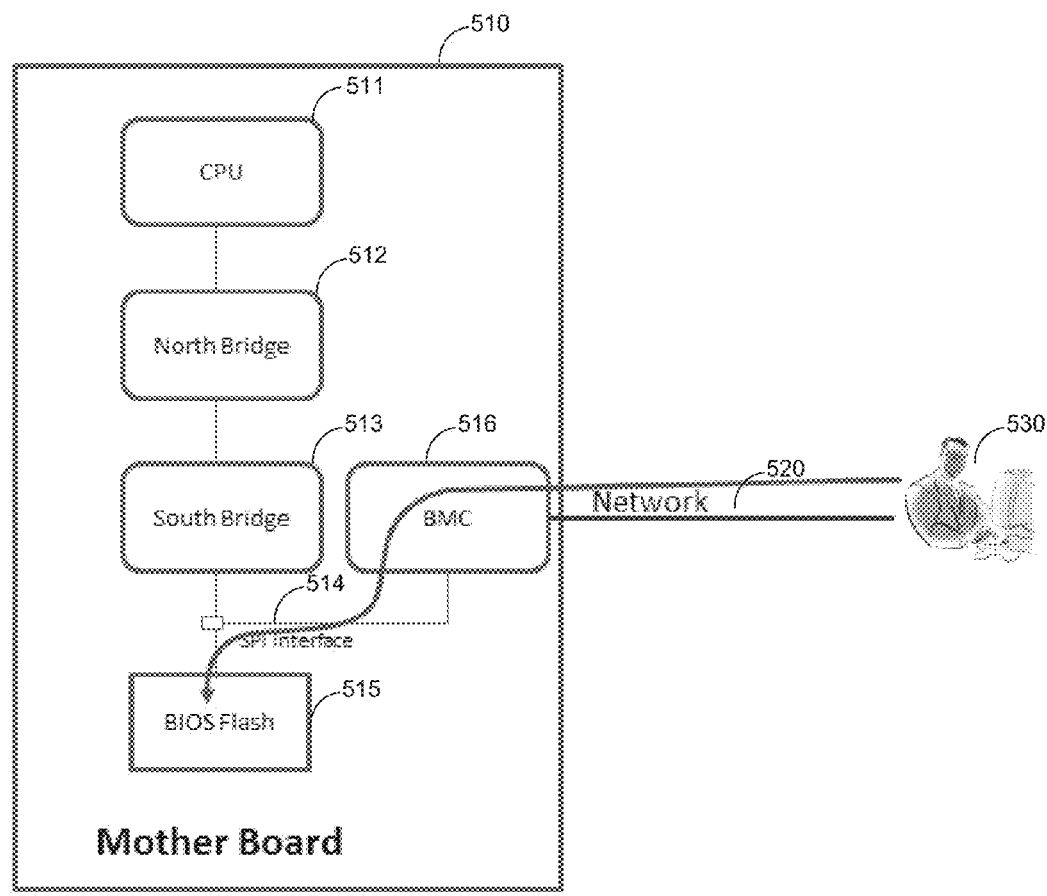
FIG. 5 illustrates a block diagram of an example system for managing a BIOS memory.

FIG. 5 illustrates a block diagram of an example system 500 for managing a BIOS memory (e.g. flash memory storing BIOS instructions or code) 515. An administrator 530 may wish to store new BIOS data into the BIOS memory 515. On a motherboard 510, the CPU 511 can be connected to a northbridge 512, which can be connected to a southbridge 513. The southbridge 513 can be connected to the BIOS memory 515 via a SPI bus 514. The BIOS memory 515 can be connected to a management controller (e.g., BMC) 516 via a bus (e.g., SPI or eSPI). The administrator 530 can remotely manage the BMC 516 via a network 520 to store the new BIOS data into the BIOS memory 515. Once the new BIOS data is stored into the BIOS memory 515, the CPU can access the BIOS data as shown in FIG. 4 to initialize a computer system. As in the system of FIG. 4, the system of FIG. 5 can require each motherboard to include a BIOS memory storing BIOS data for each particular computer system.

Figure 6:
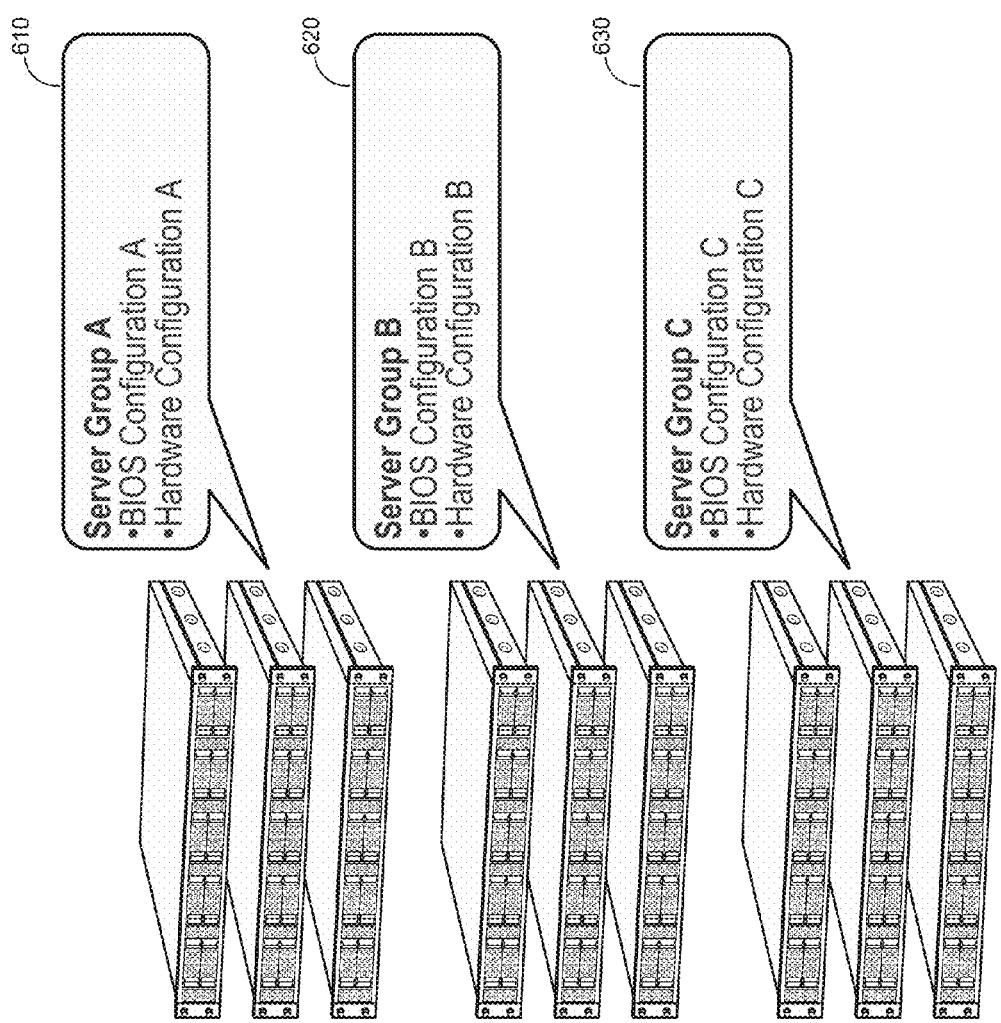
FIG. 6 illustrates an example of differing BIOS configurations for computer servers with different hardware configurations and functionalities.

FIG. 6 illustrates an example of differing BIOS configurations for computer servers with different hardware configurations and functionalities. For example, first group of computers identified as server group A can have a certain hardware configuration A and therefore requires a particular BIOS configuration A. Similarly, server group B and C can have certain hardware configurations B and C and therefore require particular BIOS configurations B and C.

Figure 7:
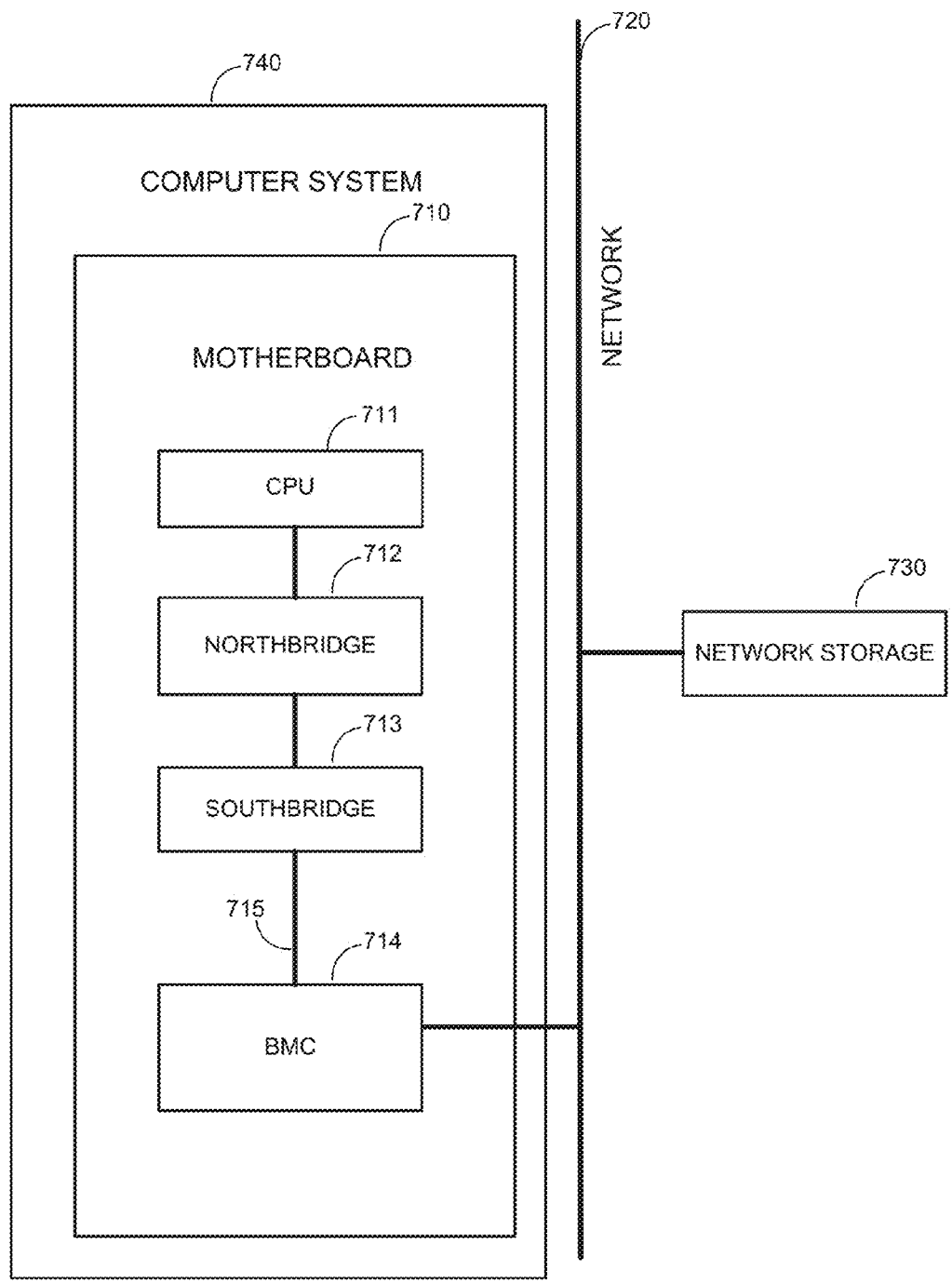
FIG. 7 illustrates a block diagram of an example system for network BIOS management, according to certain aspects of the subject technology.

FIG. 7 illustrates a block diagram of an example system 700 for network BIOS management, according to certain aspects of the subject technology. Due to the great quantity of computer servers in some data centers, a system and method that does not require each computer server to include a separate BIOS memory while allowing individualized BIOS management over a network can be both economical and time efficient. The system 700 can include a motherboard 710 of a computer system 740 which can include a processor (e.g., CPU) 711, a northbridge 712, and a southbridge 713. The computer system 750 can further include a management controller (e.g., BMC) 714 connected to the southbridge 713 via an SPI bus 715 (alternatively, an eSPI bus, a LPC bus, an ISA bus, or other such bus). In a related aspect, the computer system 740 does not include a BIOS memory.

The system can further include a network (e.g., a local access network (LAN) or the Internet) 720 that connects the computer system to a network storage 730. The network storage 730 can be any form of remote storage accessible by the network 720, such as a TFTP, HTTPS, or FTP server. The network storage 730 can store one or more BIOS data, where each BIOS data corresponds to one or more computer servers. For example, the network storage 730 can store a particular BIOS data for use by the computer system 710.

A user can request the computer system 740 to power on. For example, the user can use a physical power switch or a command a remote power switch to power on the computer system 740. Following the request to power on the computer system 740, the management controller 714 can obtain the particular BIOS data (e.g., a BIOS image) from the network storage 730. The management controller 714 can include a slave mode interface for SPI and can be capable of emulating a BIOS flash memory over the SPI bus 715. The management controller 714 can emulate a particular BIOS memory over the SPI bus 715 based on the BIOS image. In a related aspect, the management controller 714 can store the BIOS data in a memory (e.g., NVRAM) of the management controller 714.

The management controller 714 can power on the computer system 740 after emulating the particular BIOS memory. The computer system 740 can be initialized by the CPU 711 fetching for BIOS code in the emulated BIOS memory of the management controller 714. The CPU 711 can receive the BIOS code from the management controller 714, in response to the fetching. The computer system 740 can then run POST and other startup procedures, according to the BIOS code from the BIOS memory emulated by the management controller 714. The computer system 740 can power on as if the management controller 714 was a BIOS memory on the motherboard 710 of the computer system 740, thus eliminating the need for the motherboard 710 to include a BIOS memory.

In a related aspect, the computer system 740 can receive user (e.g., administrator) input for changing BIOS settings. For example, during boot into the emulated BIOS memory, an administrator can input configuration/settings changes into the emulated BIOS memory using a BIOS setup utility. In another example, an administrator can input configuration/settings changes into the emulated BIOS memory using an application running in an operating system.

In a related aspect, the computer system 740 can determine a new BIOS data based on the user input of configuration/settings changes, and store the new BIOS data on the network storage 730 for use during a subsequent initialization of the computer system 710. For example, the management controller 714 can send the new BIOS data to the network storage 730 over the network 720. In another example, an application running on an operating system of the computer system 740 can send the new BIOS data to the network storage 730 over the network 720. The new BIOS data can be stored as a new BIOS image in the network storage 730 to be used in a subsequent initialization of the computer system 740 for the management controller 714 to emulate a new BIOS memory.

The various illustrative logical blocks, modules, and circuits described in connection with the disclosure herein can be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration.

The operations of a method or algorithm described in connection with the disclosure herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

In one or more exemplary designs, the functions described can be implemented in hardware, software, firmware, or any combination thereof. If implemented in software, the functions can be stored on or transmitted over as one or more instructions or code on a non-transitory computer-readable medium. Non-transitory computer-readable media includes both computer storage media and communication media including any medium that facilitates transfer of a computer program from one place to another. A storage media can be any available media that can be accessed by a general purpose or special purpose computer. By way of example, and not limitation, such computer-readable media can include RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Disk and disc, as used herein, includes compact disc (CD), laser disc, optical disc, digital versatile disc (DVD), floppy disk and blue ray disc where disks usually reproduce data magnetically, while discs reproduce data optically with lasers. Combinations of the above should also be included within the scope of non-transitory computer-readable media.

The previous description of the disclosure is provided to enable any person skilled in the art to make or use the disclosure. Various modifications to the disclosure will be readily apparent to those skilled in the art, and the generic principles defined herein can be applied to other variations without departing from the scope of the disclosure. Thus, the disclosure is not intended to be limited to the examples and designs described herein, but is to be accorded the widest scope consistent with the principles and novel features disclosed herein.

The invention claimed is:

1. A method, by a computer system, comprising:
   determining a Basic Input/Output System (BIOS) image based on user input; and
   storing the BIOS image on a network storage for use during a subsequent initialization of the computer system;
   obtaining the BIOS image from the network storage by a management controller of the computer system;
   emulating a BIOS memory by the management controller based on the BIOS image;
   powering on, by the management controller, the computer system, in response to completing emulation of the BIOS memory;
   initializing the computer system with the BIOS memory emulated by the management controller; and
   booting the computer system with the BIOS memory emulated by the management controller.

2. The method of claim 1, further comprising powering on the computer system after emulating the BIOS memory.

3. The method of claim 1, further comprising storing the BIOS data in a memory of the management controller.

4. The method of claim 1, wherein emulating comprises emulating a BIOS flash memory connected to a bus interface such as a Serial Peripheral Interface (SPI) bus, a Low Pin Count (LPC) bus, an Industry Standard Architecture (ISA) bus, or an Enhanced Serial Peripheral Interface (eSPI) bus.

5. The method of claim 1, further comprising fetching for BIOS code from a bus interface such as a Serial Peripheral Interface (SPI) bus, a Low Pin Count (LPC) bus, an Industry Standard Architecture (ISA) bus, or an Enhanced Serial Peripheral Interface (eSPI) bus, by a central processing unit (CPU) of the computer system.

6. The method of claim 5, further comprising the CPU receiving the BIOS code from the management controller, in response to the fetching.

7. The method of claim 1, wherein the BIOS data includes a BIOS image.

8. The method of claim 1, wherein the computer system is free from an actual BIOS memory.

9. An apparatus comprising:
   a management controller configured for determining Basic Input/Output System (BIOS) image based on user input, storing the BIOS data image on a network storage for use during a subsequent initialization of the apparatus, obtaining the BIOS image from the network storage, emulating a BIOS memory based on the BIOS data, and powering on the apparatus, in response to completing emulation of the BIOS memory;
   at least one processor configured for initializing the apparatus with the BIOS memory emulated by the management controller; and
   a memory coupled to the at least one processor for storing data.

10. The apparatus of claim 9, wherein the emulating comprises emulating a BIOS flash memory connected to a bus interface such as a Serial Peripheral Interface (SPI) bus, a Low Pin Count (LPC) bus, an Industry Standard Architecture (ISA) bus, or an Enhanced Serial Peripheral Interface (eSPI) bus.

11. The apparatus of claim 9, wherein the management controller includes a slave mode interface for a bus interface such as a Serial Peripheral Interface (SPI) bus, a Low Pin Count (LPC) bus, an Industry Standard Architecture (ISA) bus, or an Enhanced Serial Peripheral Interface (eSPI) bus.

12. The apparatus of claim 9, wherein the at least one processor is further configured for fetching for BIOS code from a bus interface such as a Serial Peripheral Interface (SPI) bus, a Low Pin Count (LPC) bus, an Industry Standard Architecture (ISA) bus, or an Enhanced Serial Peripheral Interface (eSPI) bus.

13. The apparatus of claim 9, wherein the management controller includes a baseboard management controller (BMC).

14. The apparatus of claim 9, wherein the apparatus is free from an actual BIOS memory.

15. The apparatus of claim 9, wherein the management controller is connected to a southbridge chip via a bus interface such as a Serial Peripheral Interface (SPI) bus, a Low Pin Count (LPC) bus, an Industry Standard Architecture (ISA) bus, or an Enhanced Serial Peripheral Interface (eSPI) bus.

16. A non-transitory computer-readable medium storing executable instructions which cause a data processing device to:
   determine Basic Input/Output System (BIOS) image based on user input; and
   store the BIOS image on a network storage for use during a subsequent initialization of the data processing device;
   obtain the BIOS image from the network storage;
   emulate a BIOS memory based on the BIOS image;
   power on the computer system, in response to completing emulation of the BIOS memory;
   initialize a computer system with the BIOS memory emulated; and
   boot the computer system with the BIOS memory emulated by the management controller.

17. The non-transitory computer-readable medium of claim 16, wherein the computer-readable medium further causes the data processing device to fetch for BIOS code from a bus interface such as a Serial Peripheral Interface (SPI) bus, a Low Pin Count (LPC) bus, an Industry Standard Architecture (ISA) bus, or an Enhanced Serial Peripheral Interface (eSPI) bus.

* * * * *